United States Patent [19]
Rauch

[11] 3,927,720
[45] Dec. 23, 1975

[54] LAWN PLUGGER

[76] Inventor: Erwin I. Rauch, 1431 Monticello Lane, Rockford, Ill. 61107

[22] Filed: Mar. 20, 1974

[21] Appl. No.: 452,743

[52] U.S. Cl. .................... 172/22; 111/99; 294/50.7
[51] Int. Cl.² ........................................... A01B 1/24
[58] Field of Search .......... 294/50, 50.5, 50.6, 50.7, 294/50.8, 50.9, 61, 19 R; 111/99; 30/130; 172/19, 21, 22

[56] References Cited
UNITED STATES PATENTS

| | | | |
|---|---|---|---|
| 554,139 | 2/1896 | Ober | 294/50.5 |
| 3,830,310 | 8/1974 | Williams | 294/50.7 X |

Primary Examiner—James B. Marbert
Assistant Examiner—Johnny D. Cherry
Attorney, Agent, or Firm—Wolfe, Hubbard, Leydig, Voit & Osann, Ltd.

[57] ABSTRACT

A lawn plugger includes a tubular body with a hollow punch attached to the lower end thereof. A foot is held slidably on the punch by a spring connected between the body and the foot. In use, the punch is thrust into the ground cutting out a plug and causing the foot to slide upwardly on the punch thereby compressing the spring. As a result, the spring urges the foot against the ground around the plug being removed and, at the same time, urges the plugger upwardly to assist in withdrawing the punch from the ground. As an incident to removing subsequent plugs from the ground, the prior plugs are forced upwardly through the punch and into the body by the new plugs. Within the body, a diverter directs the old plugs out through an opening in the side of the body.

10 Claims, 4 Drawing Figures

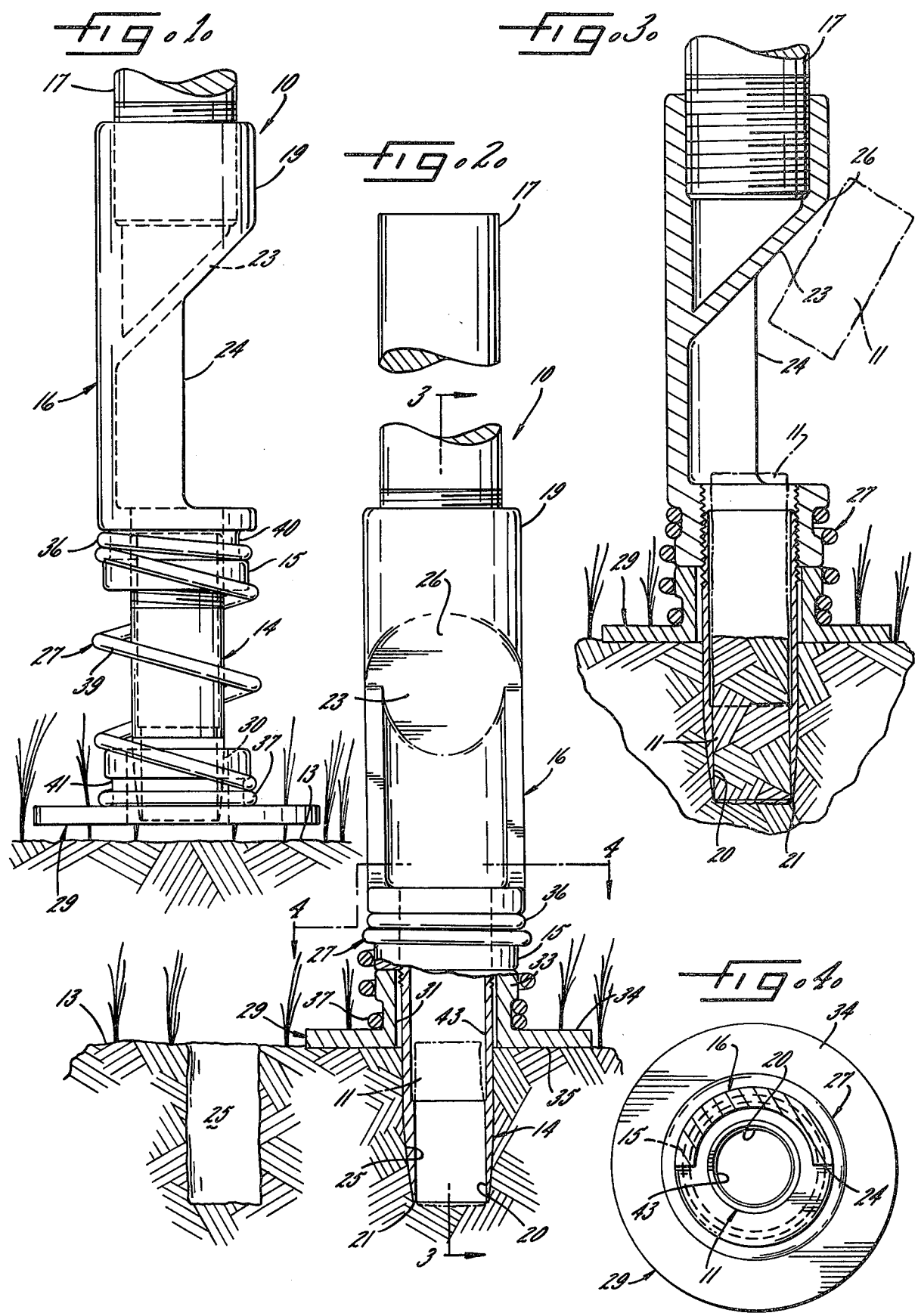

LAWN PLUGGER

BACKGROUND OF THE INVENTION

This invention relates to a lawn plugger such as is used to remove small plugs of earth from a lawn to better aerate the lawn and thereby enhance the growth of the grass in the lawn. More particularly, the present invention relates to a hand-operated lawn plugger such as is used in a reciprocating motion to remove successive plugs of earth from the lawn.

One lawn plugger of the foregoing type is shown in Sterk U.S. Pat. No. 3,534,994 to include a hollow punch carried on the lower end of a tubular body. As the punch is reciprocally driven into the ground, successive plugs are pushed upwardly through the punch, into the body and are ejected through an opening in the side of the body by a diverter.

Other U.S. patents which may be considered to be pertinent to the prosecution of the application on the present invention are U.S. Pat. Nos. 1,692,436 and 2,057,142.

SUMMARY OF THE INVENTION

The primary object of the present invention is to provide a novel lawn plugger of the above general character which is particularly easy to use while remaining simple and inexpensive to manufacture. A more detailed object is to accomplish the foregoing by constructing the lawn plugger to include a spring so the plugger can be bounced easily from place to place in the lawn to remove plugs with little or virtually no effort being required to pull the punch from the ground as each plug is removed.

A further object of the present invention is to construct the plugger to include a foot which is urged against the lawn by the spring as the punch is being pulled upwardly from the ground so as to virtually eliminate tearing damage to the lawn around the plug hole which otherwise may be caused by the punch as it is pulled upwardly.

The invention further resides in the provision of a relief or recess within the axial opening of the punch so as to lessen the effort required to drive the punch into the ground by enabling the plugs to slide more easily through the punch and into the body. Also, the invention resides in the novel construction of the plugger to include a weighted handle which coacts with the spring during use of the plugger to reduce the effort required by a user to operate the plugger.

These and other objects and advantages of the present invention will become more apparent from the following detailed description when taken in conjunction with the accompanying drawings.

BRIEF DESCRIPTION OF THE DRAWINGS

FIG. 1 is a fragmentary front elevational view of a lawn plugger embodying the novel features of the present invention.

FIG. 2 is a fragmentary side elevational view with portions of the plugger broken away and shown in cross section.

FIG. 3 is a cross-sectional view taken substantially along line 3—3 of FIG. 2.

FIG. 4 is a cross-sectional view taken substantially along line 4—4 of FIG. 2.

DETAILED DESCRIPTION OF THE PREFERRED EMBODIMENT

As shown in the drawings for purposes of illustration, the present invention is embodied in a hand-operated lawn plugger 10 particularly adapted for use in removing plugs 11 of earth from a lawn 13 to aerate the latter and thereby stimulate the growth of the grass in the lawn. Herein, a hollow punch 14 is threaded onto the lower end 15 of a tubular body 16 having an elongated handle 17 attached to the upper end 19 thereof. An axial passage 20 (see FIG. 3) extends through the punch and communicates with the interior of the body. The lower end of the punch is formed with a cutting edge 21 so that, as the punch is thrust into the lawn, a plug 11 is cut from the lawn as shown in FIG. 2.

In use, the plugger 10 is moved vertically in a reciprocating manner to remove successive plugs 11 of earth from the lawn 13 while moving from place to place in the lawn. With each downward stroke of the plugger, the previously removed plugs are pushed upwardly through the punch 14 by the new plug being cut from the lawn. As an incident to removing the new plug, means including a diverter 23 (FIGS. 2 and 3) deflect the uppermost plug in the body 16 out of the body through an elongated opening 24 in the side of the body. On the upstroke, the lower plug is held within the punch by friction with the side walls of the passage 20 and is pulled from the lawn leaving a cleanly cut hole 25 (FIG. 2) in the lawn for aeration of the grass. As shown in FIGS. 2 and 3, the diverter comprises a plate 23 fixed to the interior of the body and extending in a downwardly slanted direction from adjacent the upper edge 26 of the opening and completely across the interior of the body. Accordingly, as the uppermost plug hits the plate on the downstroke of the plugger, the plug is deflected out through the opening and onto the lawn.

In accordance with the primary aspect of the present invention, a spring 27 is mounted within the lawn plugger 10 to make the latter much easier to use while still keeping the construction of the plugger simple and inexpensive to manufacture. For these purposes, a slidable foot 29 is telescoped over the punch 14 with the spring being mounted between the body 16 and the foot and urging the latter toward the lower end portion 30 of the punch. On the downward stroke of the plugger, the spring is compressed between the foot and the body and, thus, provides an upward thrust to the upstroke of the plugger making it virtually effortless to pull the punch from the lawn 13 to remove a plug 11. As a result of the novel spring construction, the plugger may be bounced in a rhythmic, reciprocating manner from place to place in the lawn to remove plugs effortlessly and at a high rate of speed.

In the present instance, the foot 29 is formed with a central opening 31 (FIG. 2) and includes a generally cylindrical collar portion 33 telescoped onto the punch 14 and projecting upwardly from an annular flange 34. The latter is formed integrally with the collar and projects outwardly therefrom in a generally radial direction with respect to the central axis of the punch (see FIGS. 2 and 4) so as to provide a flat undersurface 35 for engagement with the lawn 13 around the hole 25. The central opening 31 is larger in diameter than the diameter of the punch thereby enabling the foot to slide vertically on the punch as the lawn is being plugged.

While different spring arrangements may be employed in the present invention to retain the foot 29 on the punch 14, preferably, the spring 27 is a coil spring which in its relaxed position holds the foot on the punch with the collar 33 surrounding the lower end portion 30 of the punch and the undersurface 35 generally level with the cutting edge 21. Herein, the upper and lower end coils 36 and 37 (FIG. 1) of the spring are smaller in diameter than the intermediate coils 39 so as to grip the body and the foot, respectively, to hold the foot slidably on the punch. More particularly, the upper coil fits with a snap-fit easily into a first annular groove 40 formed in the lower portion 15 of the body while the lower coil fits in a similar manner in a second annular groove 41 formed in the collar 33 adjacent the flange 34. Thus, the foot is held loosely on the punch for vertical sliding movement as the plugger is reciprocated vertically to remove the plugs 11 of earth from the lawn 13.

To assure that plugs 11 slide easily through the punch 14 and are kept from jamming within the punch, an annular recess 43 (FIGS. 2 and 4) is provided in the interior of the punch in upper end portion thereof. The recess enlarges the upper end portion of the passage 20 through the punch so that only the sides of the passage adjacent the lower end portion thereof frictionally engage and hold the plugs within the punch (see FIGS. 2 and 3). Accordingly, the plugs are assured of being cut from the lawn to form the aeration holes 25 rather than forming holes in the lawn by simply pressing an indentation into the ground with a blocked up punch.

In use, the lawn plugger 10 is held generally perpendicular to the lawn 13 by the handle 17 and simply is moved in a reciprocating fashion to drive the punch 14 into the lawn to remove each plug 11. As the punch penetrates the lawn, the foot 29 is pushed upwardly on the punch by engagement with the lawn thereby compressing the spring 27 between the foot and the body 16. Penetration of the punch into the lawn is limited by the foot as the upper end of the collar 33 abuts the lower end 15 of the body. At this point, the spring has reached its fullest extent of compression, the plugger having, in effect, bottomed-out in the lawn. Advantageously, as the plugger is pulled upwardly to withdraw the new plug from the lawn, the spring expands between the foot and the body and thus urges the plugger upwardly while at the same time holding the foot against the lawn around the hole 25. As a result, the plugger virtually is bounced off the lawn to remove the punch from the hole while at the same time the lawn around the hole is held against being pulled upwardly by the punch and possibly being torn loose from around the hole.

Advantageously, by mounting the spring 27 between the foot 29 and the body 16, the plugger 10 is adapted for particularly easy handling during use because the force required of a user to operate the plugger is distributed more evenly throughout each reciprocation of the plugger with a portion of the downward stroke force being stored in the spring to aid in the lifting of the plugger on the upward stroke. Because of this, the plugger literally may be bounced from place to place across the lawn to remove the plugs. In addition to the spring, it has been found advantageous to construct the handle 17 of a heavy material such as a heavy metal pipe or rod so little effort is required to thrust the plugger downwardly with sufficient force to cut out a plug. Accordingly, when using the plugger, a natural rhythm develops in the reciprocating motion required of the user with only a slight addition downward thrust and upward pull being required in each bounce to keep the plugger moving. This force can be minimized easily on the part of a user by simply listening for a "click" of the foot against the body as the punch reaches its full depth of penetration. As a result, the plugs can be removed from the lawn at an amazingly high rate of speed even exceeding 200 plugs per minute. Thus, with the lawn plugger of the present invention a large area of the lawn may be aerated by hand in just a matter of minutes.

I claim as my invention:

1. A hand-operated lawn plugger including an elongated, generally cylindrical body member, a hollow punch member connected to and extending downwardly from the lower end of said body, a foot telescoped over the lower end portion of said punch member and having a generally flat undersurface extending outwardly from adjacent said punch in a generally radial direction, said foot being slidable upwardly relative to said punch member as the latter is thrust by hand into the lawn to remove a plug of earth, and spring means fastened to one of said members and said foot and acting therebetween so as to urge said foot against the lawn and having sufficient strength to provide an upward thrust to said plugger as to withdraw the punch substantially from the lawn so the plugger may be bounced in a rhythmic, reciprocating manner from place to place in the lawn to remove successive plugs of earth.

2. A hand-operated lawn plugger including a tubular body, a hollow punch connected to and extending in a generally axial direction downwardly from the lower end of said body to remove a plug of earth from the lawn upon being moved vertically into and out of the lawn, means for ejecting the plug from the plugger as an incident to removing subsequent plugs from the lawn, a foot telescoped over the lower end portion of said punch and having a generally flat undersurface extending outwardly from adjacent said punch in a generally radial direction, said foot being slidable upwardly relative thereto as the punch is thrust into the lawn, and a spring fastened between said body and said foot and being compressed therebetween by the upward sliding of said foot so as to urge said foot against the lawn, said spring having sufficient strength to provide an upward thrust to the plugger to pull the punch substantially out of the lawn so the plugger may be bounced in a rhythmic, reciprocating manner from place to place in the lawn to remove successive plugs of earth.

3. A lawn plugger as defined by claim 2 wherein said body includes an elongated weighted handle extending in a generally axial direction upwardly from the upper end thereof.

4. A lawn plugger as defined by claim 3 wherein said plug ejecting means includes an elongated opening formed through the side of said body and a diverter for deflecting said plugs through said opening and out of said body.

5. A lawn plugger as defined by claim 4 wherein said diverter comprises a plate extending in a downwardly slanted direction from the upper end of said opening completely across the interior of said body.

6. A lawn plugger as defined by claim 3 wherein said spring is a coil spring telescoped over said punch between said foot and said body, said spring having an upper end connected to said body and a lower end connected to said foot.

7. A lawn plugger as defined by claim 6 including first and second annular grooves formed in the lower end portion of said body and the upper end portion of said foot, respectively, the upper and lower end portions of said spring being captivated within said first and second grooves, respectively.

8. A lawn plugger as defined by claim 6 wherein said foot includes an annular flange forming the lower end portion thereof and extending in a generally radial direction away from the axis of said punch for engagement with the lawn around the punch.

9. A lawn plugger as defined by claim 8 wherein said punch includes a generally cylindrical axial passage extending therethrough, an annular recess formed in the interior of said punch in upper end portion thereof so the upper end of said passage is larger in diameter than the diameter of the lower end portion of said passage so the plugs slide freely through the upper end portion of the passage and into the interior of said body, the interior of said body being larger in diameter than the diameter of said passage.

10. A hand-operated lawn plugger including a tubular body having a weighted handle extending upwardly from the upper end thereof, an elongated opening in the side thereof and a diverter extending across the interior of said body adjacent said opening to deflect plugs of earth out of said body through said opening, a hollow punch connected to and extending in a generally axial direction downwardly from the lower end of said body, a foot telescoped over the lower end portion of said punch and having a generally flat undersurface extending outwardly from adjacent said punch in a generally radial direction, said foot being slidable upwardly relative to said punch as the latter is thrust into the lawn to remove a plug of earth, and a spring fastened between said body and said foot and being compressed therebetween by the upward sliding of said foot so as to urge said foot against the lawn, said spring having sufficient strength to provide an upward thrust to said plugger to pull the punch substantially out of the lawn thereby enabling the plugger to be bounced in a rhythmic, reciprocating manner from place to place in the lawn to remove the plugs of earth.

* * * * *